United States Patent
Miyamoto et al.

(10) Patent No.: US 9,283,850 B2
(45) Date of Patent: Mar. 15, 2016

(54) SEMICONDUCTOR DEVICE AND COOLING SYSTEM FOR SEMICONDUCTOR DEVICE

(75) Inventors: Noboru Miyamoto, Tokyo (JP); Mitsunori Aiko, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 650 days.

(21) Appl. No.: 13/619,434

(22) Filed: Sep. 14, 2012

(65) Prior Publication Data

US 2013/0215571 A1 Aug. 22, 2013

(30) Foreign Application Priority Data

Feb. 17, 2012 (JP) ................................. 2012-032544

(51) Int. Cl.
*B60L 1/00* (2006.01)

(52) U.S. Cl.
CPC ........... *B60L 1/003* (2013.01); *B60L 2240/525* (2013.01)

(58) Field of Classification Search
CPC ..................... H01L 21/67248; B60L 2240/36; B60L 2240/425; F01P 2025/12; B60H 1/143
See application file for complete search history.

(56) References Cited

U.S. PATENT DOCUMENTS

| | | | |
|---|---|---|---|
| 5,235,501 A | 8/1993 | Stuart et al. | |
| 5,506,539 A * | 4/1996 | Kelly et al. | 327/379 |
| 6,664,751 B1 * | 12/2003 | Gabriel et al. | 318/599 |
| 7,151,401 B2 | 12/2006 | Inoue | |
| 2007/0158575 A1 | 7/2007 | Heismann et al. | |
| 2008/0122497 A1 * | 5/2008 | Ishikawa et al. | 327/108 |
| 2011/0221481 A1 * | 9/2011 | Kifuku | 327/109 |

FOREIGN PATENT DOCUMENTS

| | | |
|---|---|---|
| CN | 1988153 A | 6/2007 |
| CN | 101376337 A | 3/2009 |
| DE | 102005061358 A1 | 7/2007 |
| EP | 0631220 A2 | 12/1994 |
| JP | S61-231874 A | 10/1986 |
| JP | S61-247273 A | 11/1986 |
| JP | 5-336732 A | 12/1993 |
| JP | 2000-340371 A | 12/2000 |
| JP | 2004-166341 A | 6/2004 |
| JP | 2005-45590 A | 2/2005 |

(Continued)

OTHER PUBLICATIONS

An Office Action issued by the German Patent Office on Aug. 8, 2014, which corresponds to German Patent Application No. 10 2012 223 136.6 and is related to U.S. Appl. No. 13/619,434; with English language translation.

(Continued)

*Primary Examiner* — Marc Norman
(74) *Attorney, Agent, or Firm* — Studebaker & Brackett PC (57) ABSTRACT

A semiconductor device of the present invention is a semiconductor device applicable in a cooling system including an ECU functioning as a setting part that sets target temperature of a refrigerant used to cool the semiconductor device, and a sensor functioning as a detector that detects the temperature of the refrigerant as refrigerant's temperature. The semiconductor device generates variable heating loss. The semiconductor device includes a heating controller that controls the heating loss in the semiconductor device such that the target temperature and the refrigerant's temperature become the same.

21 Claims, 4 Drawing Sheets

(56) References Cited

FOREIGN PATENT DOCUMENTS

| JP | 2005-228853 A | 8/2005 |
|----|---------------|--------|
| JP | 2005-353880 A | 12/2005 |
| JP | 2007-069733 A | 3/2007 |
| JP | 2009-105389 A | 5/2009 |
| JP | 2009-232618 A | 10/2009 |

OTHER PUBLICATIONS

The First Office Action issued by the Chinese Patent Office on Apr. 3, 2015, which corresponds to Chinese Patent Application No. 201210391833.6 and is related to U.S. Appl. No. 13/619,434; with English language translation.

An Office Action; "Notification of Reason(s) for Rejection," issued by the Japanese Patent Office on Mar. 31, 2015, which corresponds to Japanese Patent Application No. 2012-032544 and is related to U.S. Appl. No. 13/619,434; with English language partial translation.

The second Office Action issued by the Chinese Patent Office on Dec. 22, 2015, which corresponds to Chinese Patent Application No. 201210391833.6 and is related to U.S. Appl. No. 13/619,434; with English language partial translation.

\* cited by examiner

SEMICONDUCTOR DEVICE AND COOLING SYSTEM FOR SEMICONDUCTOR DEVICE

BACKGROUND OF THE INVENTION

1. Field of the Invention

The present invention relates to a semiconductor device and a cooling system for cooling the semiconductor device, and more specifically, to a semiconductor device that operates an electrically powered member and a cooling system for cooling the semiconductor device.

2. Description of the Background Art

Regarding vehicles and the like put into practical use in recent years, engine drive is controlled electronically and increasing weight has been put on electronic circuits such as semiconductor devices used for the control. Further, electric vehicles that do not rely on engine drive but use electric power as power sources have also been put into practical use (see Japanese Patent Application Laid-Open No. 2004-166341). Electronic circuits such as semiconductor devices are also used in control of electric vehicles.

In conventional engine driven vehicles, engines are used as heat sources for vehicles' facilities such as air conditioners. Meanwhile, engines are generally not provided in electric vehicles and the like. So, in order to realize temperature control function such as air conditioners in electric vehicles, heat sources such as electric heaters should be prepared additionally.

However, electric heaters generate large power losses. So, power consumption is increased if additionally prepared electric heaters are used, for example. Increase in power consumption reduces electric power available as power sources, resulting in a problem of reduction of a distance to empty in electric vehicles. A problem of reduction of a distance to empty also occurs if the weights of entire vehicles are increased by placement of electric heater units.

Like conventional engine driven vehicles, vehicles using electricity and equipped with engines such as hybrid vehicles are capable of using the engines as heat sources. Meanwhile, these engines should be driven for the purpose of heating up catalysts or actuator units in addition to the purpose of driving the vehicles, making a cause for worsened fuel economy.

SUMMARY OF THE INVENTION

It is an object of the present invention to provide a semiconductor device and a cooling system for the semiconductor device capable of obtaining a necessary heat source of an electrically powered member using electric power as a power source while suppressing reduction of a distance to empty of the electrically powered member.

According to the present invention, the semiconductor device is applicable in the cooling system including a setting part that sets target temperature of a refrigerant used to cool the semiconductor device, and a detector that detects the temperature of the refrigerant as refrigerant's temperature. The semiconductor device generates variable heating loss. The semiconductor device includes a heating controller that controls the heating loss in the semiconductor device such that the target temperature and the refrigerant's temperature become the same.

According to the present invention, the cooling system includes: a semiconductor device mounted on an electrically powered member driven with electric power and operating the electrically powered member; a cooler that cools the semiconductor device with a refrigerant; a setting part that sets target temperature of the refrigerant; a detector that detects the temperature of the refrigerant as refrigerant's temperature; and a heat exchanger that performs heat exchange with a heat exchange target in the electrically powered member by using the refrigerant. The semiconductor device generates variable heating loss. The cooling system further includes a heating controller that controls the heating loss in the semiconductor device such that the target temperature and the refrigerant's temperature become the same.

The semiconductor device of the present invention includes the heating controller that controls the heating loss in the semiconductor device such that the target temperature and the refrigerant's temperature become the same. Controlling the heating loss can change the refrigerant's temperature, making it possible to obtain a heat source that achieves the target temperature.

The cooling system of the present invention includes the heat exchanger that performs heat exchange with a heat exchange target in the electrically powered member by using the refrigerant, and the heating controller that controls the heating loss in the semiconductor device such that the target temperature and the refrigerant's temperature become the same. Thus, a heat source required for heat exchange can be obtained in the electrically powered member while reduction of a distance to empty of the electrically powered member is suppressed.

These and other objects, features, aspects and advantages of the present invention will become more apparent from the following detailed description of the present invention when taken in conjunction with the accompanying drawings.

EMBODIMENT FOR CARRYING OUT THE INVENTION

<Preferred Embodiment>
<Structure>

Figure 1:
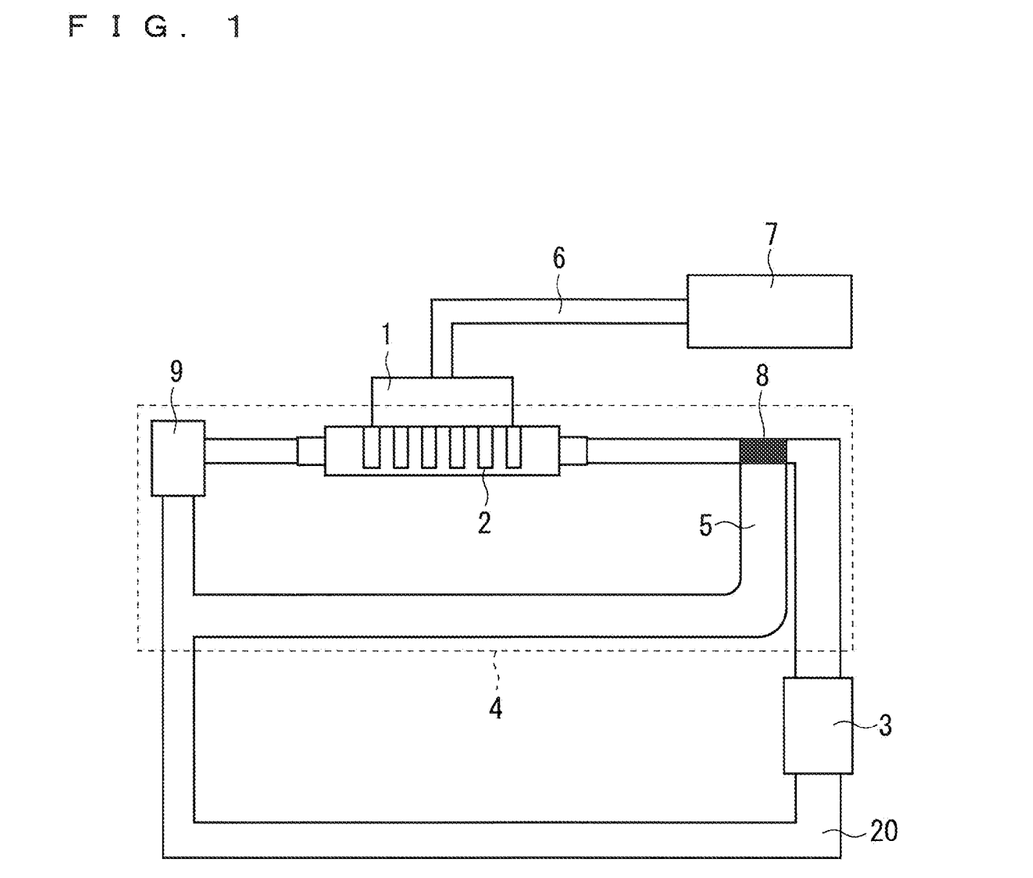
FIG. 1 is a conceptual view showing the structures of a semiconductor device and a cooling system for the semiconductor device of a preferred embodiment of the present invention.

FIG. 1 is a conceptual view showing the structures of a semiconductor device and a cooling system that cools the semiconductor device of a preferred embodiment of the present invention. The semiconductor device and the cooling system mainly described in the preferred embodiment are those mounted on electric vehicles. However, electric vehicles are only an example of an electrically powered member, and is not the only purpose of the semiconductor device and the cooling system of the preferred embodiment.

As shown in FIG. 1, the cooling system includes: a semiconductor device 1 capable of changing loss (heating loss) generated in the semiconductor device 1 itself; a cooler 2 that cools the semiconductor device 1 with a refrigerant (such as cooling water); a flow path 20 through which the refrigerant used in the cooler 2 flows; a water pump 9 and a radiator 3 provided in the flow path 20; a refrigerant bypass flow path 5 being part of the flow path 20, the refrigerant being determined to flow into or not to flow into the refrigerant bypass flow path 5 by a flow path bypass switch 8; and an ECU (electronic control unit) 7 that transmits and receives a predetermined signal to and from the semiconductor device 1 through a communication system 6.

The cooler 2 and the flow path 20 including the refrigerant bypass flow path 5 function as a heat exchanger 4 that performs heat exchange with a heat exchange target (not shown in the drawings).

In the preferred embodiment, heat generated in the semiconductor device 1 is transferred to the refrigerant in the flow path 20. The heat is further transferred in the heat exchanger 4 from the refrigerant to a heat exchange target (not shown in the drawings). In this way, heat of the semiconductor device 1 is transferred to a heat exchange target to allow the heat exchange target to reach desirable temperature.

The constituent elements are described individually.

The semiconductor device 1 drives and operates an electric vehicle on which the semiconductor device 1 is mounted, and is an inverter device, for example. The semiconductor device 1 is arranged on a surface of the cooler 2 so as to contact the surface of the cooler 2.

The cooler 2 is arranged so as to contact the semiconductor device 1. The cooler 2 cools the semiconductor device 1 in which heat is generated in response to drive of the electric vehicle. A refrigerant (cooling water) is supplied through the flow path 20 to the cooler 2.

The heat exchanger 4 lets the heat of the refrigerant escape that is given by the semiconductor device 1, and realizes exchange of the heat with a heat exchange target.

The ECU 7 is a microcomputer and the like capable of electronically controlling drive of a vehicle, operations of vehicle' facilities, and operation of the cooling system.

This electronic control includes control of the water temperature of cooling water for cooling an inverter, control of the water temperature of cooling water for cooling an engine if the engine is provided in a vehicle, control of the temperature of oil for driving an actuator, control of the operation of an air conditioner, and control of the flow rate of a refrigerant, for example.

Figure 2:
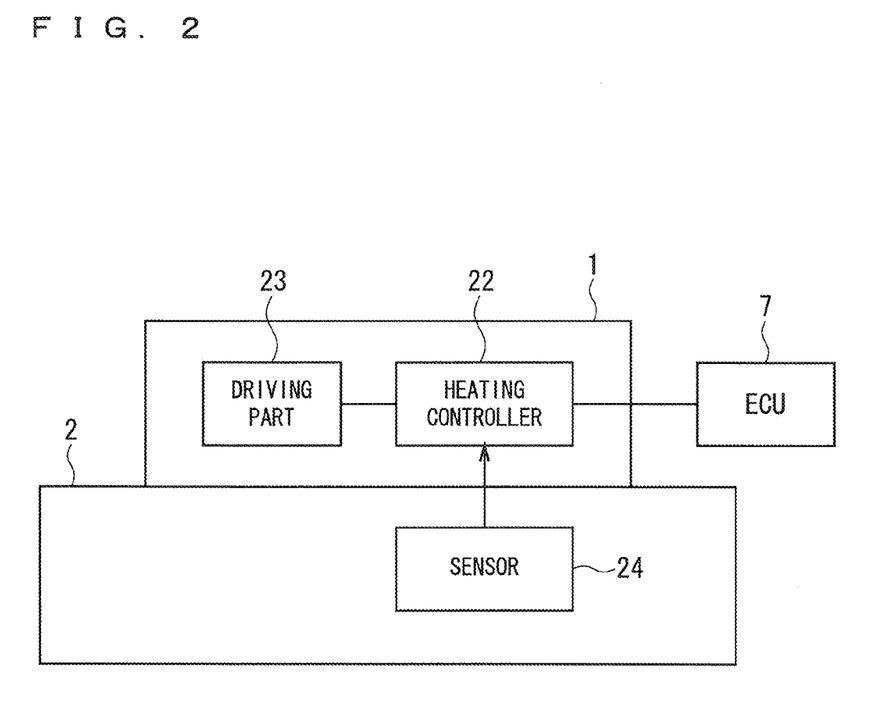
FIG. 2 shows the structural concepts in more detail of the semiconductor device and a cooler of the preferred embodiment of the present invention.

FIG. 2 shows the structural concepts of the semiconductor device 1 and the cooler 2 in more detail. As shown in FIG. 2, the semiconductor device 1 includes a driving part 23 that drives an electric vehicle, and a heating controller 22 that controls heating loss in the driving part 23. The driving part 23 includes a semiconductor element, for example. The heating controller 22 includes elements to change current, voltage and the like, and a device to give instruction signals to these elements.

The heating controller 22 receives a signal indicating refrigerant's temperature from a sensor 24 (detector) that detects the temperature of the refrigerant (refrigerant's temperature) in the cooler 2. The sensor 24 is not necessarily placed on the cooler 2 as shown in FIG. 2, but it may be placed in a predetermined position in the flow path 20, for example.

The heating controller 22 receives a signal indicating target temperature from the ECU 7 functioning as a setting part. The target temperature mentioned here is appropriately set temperature desired for the refrigerant that functions as a heat source during heat exchange with a heat exchange target (such as in-vehicle atmosphere). The target temperature is determined based on temperature appropriate for a heat exchange target, namely, temperature desired to be obtained by the heat exchange target.

It is assumed for example that current in-vehicle atmosphere is at 10° C., and that the temperature of the in-vehicle atmosphere is desired to be increased to 15° C. as a result of heat exchange with the refrigerant. In this case, the target temperature of the refrigerant is set at 15° C., for example. In consideration of efficiency or speed of heat exchange, the target temperature of the refrigerant can be set at temperature higher than 15° C.

The heating controller 22 controls drive of the driving part 23 such that the target temperature and refrigerant's temperature become the same while feeding back a difference between the target temperature and the refrigerant's temperature. This control by the heating controller 22 is described in detail later.

<Operation>

The operations of the semiconductor device and the cooling system for the semiconductor device of the preferred embodiment are described next by referring to FIG. 3.

The ECU 7 receives signal outputs from various sensors in the vehicle such as a sensor for detecting the temperature of in-vehicle atmosphere, a sensor for detecting the water temperature of cooling water for cooling an engine, and a sensor for detecting the temperature of oil for driving an actuator, for example. Or, the ECU 7 receives a request signal from vehicle's facilities such as an air conditioner. Then, the ECU 7 determines if a heat source is required (step S1). By way of example, if temperatures detected by the various sensors differ by predetermined values or higher than the predetermined values from their ideal values set in advance, the ECU 7 determines that a heat source is required. Or, the ECU 7 determines that a heat source is required if the ECU 7 receives a request signal from vehicle's facilities such as an air conditioner.

If the ECU 7 determines that a heat source is required (YES in step S1), the ECU 7 exerts control to change semiconductor loss (heating loss) in a circuit of the semiconductor device 1 being an inverter and the like (step S2). More specifically, the ECU 7 notifies the semiconductor device 1 of the target temperature of a refrigerant in the cooler 2. In response, the semiconductor device 1 changes the semiconductor loss (heating loss) to achieve the target temperature by generating heat more intensively, for example. Heat generated by the semiconductor device 1 is transferred to the refrigerant in the cooler 2. If the ECU 7 determines that a heat source is not required (NO in step S1), the procedure starts again with step S1.

The semiconductor device 1 receives an output signal from the sensor 24 (see FIG. 2) that measures the temperature of the refrigerant (refrigerant's temperature) in the cooler 2 to know a difference between the target temperature the semiconductor device 1 was notified of by the ECU 7 and actual refrigerant's temperature indicated by the output signal from the sensor 24. Then, the semiconductor device 1 controls the degree of the semiconductor loss (heating loss) in the circuit so as to reduce the difference (feedback control).

Figure 4:
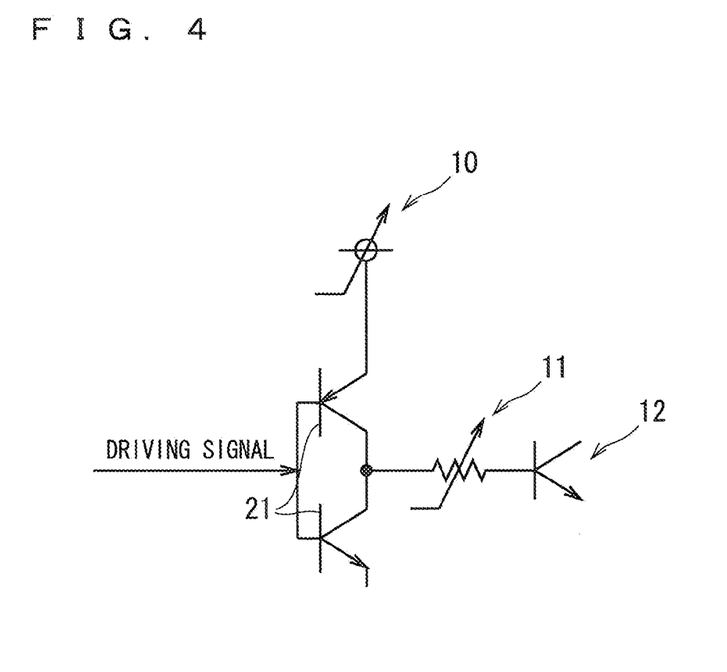
FIGS. 4 and 5 each show the structure of the semiconductor device of the preferred embodiment of the present invention.

FIG. 4 shows an example of a specific semiconductor circuit (circuit of the driving part 23 or part of the circuit of the driving part 23) intended to change semiconductor loss.

This circuit includes a variable power supply 10, a plurality of series-connected semiconductor elements 21 each having one end connected to the variable power supply 10, a variable resistor 11 connected between the semiconductor elements 21 and having one end placed between the semiconductor elements 21, and a semiconductor switch 12 connected to the opposite end of the variable resistor 11.

For control to increase semiconductor loss, the heating controller 22 (see FIG. 2) exerts at least control to increase the resistance value of the variable resistor 11 or control to reduce the voltage value of the variable power supply 10. As a result, a gate resistance is increased or a gate voltage is reduced to reduce the switching speed (turn-on and turn-off speeds) of the semiconductor switch 12, thereby achieving increase of switching loss. Increase of stationary loss is also achieved by increase of an ON voltage.

For control to reduce semiconductor loss, the heating controller 22 exerts at least control to reduce the resistance value of the variable resistor 11 or control to increase the voltage value of the variable power supply 10.

Figure 5:
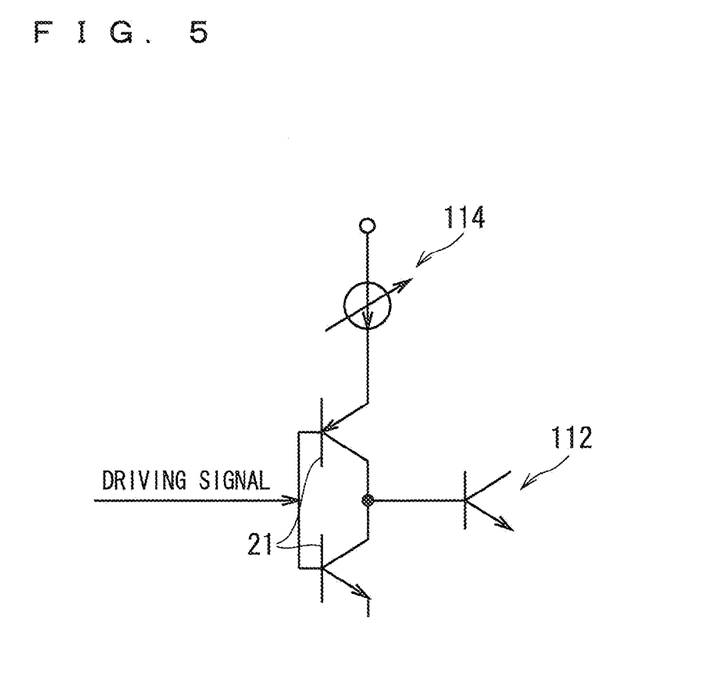

FIG. 5 shows another example of a specific semiconductor circuit intended to change semiconductor loss.

This circuit includes a variable current supply 114, a plurality of series-connected semiconductor elements 21 each having one end connected to the variable current supply 114, and a semiconductor switch 112 connected between the semiconductor elements 21 and having one end placed between the semiconductor elements 21.

For control to increase semiconductor loss, the heating controller 22 (see FIG. 2) exerts control to reduce the current value of the variable current supply 114. This control reduces a gate current to reduce the switching speed (turn-on and turn-off speeds) of the semiconductor switch 12, thereby achieving increase of switching loss.

For control to reduce semiconductor loss, the heating controller 22 exerts control to increase the current value of the variable current supply 114.

After step S2 is performed, the flow path bypass switch 8 is switched under control of the ECU 7 to cause the refrigerant to flow into the refrigerant bypass flow path 5 (step S3). This realizes contact in a contact part (not shown in the drawings) formed for example in the refrigerant bypass flow path 5 between the refrigerant and a heat exchange target in a way that allows heat transfer between the refrigerant and the heat exchange target, thereby allowing heat exchange therebetween. If heat exchange is not intended, the refrigerant is used for cooling while the flow path bypass switch 8 is not switched. Thus, the refrigerant can be used more efficiently for cooling.

Heat exchange may be performed at a difference place in the heat exchanger 4 without making operation to switch the flow path bypass switch 8. As an example, heat exchange may be performed in the cooler 2.

The entire flow path 20 including the refrigerant bypass flow path 5 or part of the flow path 20 may have a heat insulating structure. This suppresses release of heat from a heat source (heated refrigerant) until heat exchange. So, the performance of the refrigerant as a heat source is enhanced, making it possible to transfer heat to a heat exchange target more efficiently.

The ECU 7 functions as a flow rate controller. So, the ECU 7 changes the number of rotations of the water pump 9 that determines the flow rate of the refrigerant (step S4). As an example, the ECU 7 reduces the flow rate to increase refrigerant's temperature.

As described above, in the cooling system of the preferred embodiment, the refrigerant flows into the refrigerant bypass flow path 5, so the heat exchanger 4 performs heat exchange between the refrigerant and a heat exchange target.

Examples of a heat exchange target include in-vehicle air (atmosphere), cooling water for cooling an engine, oil for driving an actuator (hydraulic oil), and a catalyst for an engine (all of which are not shown in the drawings). The heat exchanger 4 contacts these heat exchange targets directly through the refrigerant, or contacts these heat exchange targets in a manner that allows heat transfer therebetween to realize heat exchange. The target temperature of the refrigerant is set at temperature desired for these heat exchange targets.

As described above, by changing loss in a vehicle's facility (semiconductor device 1) such as an inverter provided in advance in a vehicle, a heat source required for heat exchange can be maintained. Accordingly, weight saving and enhance fuel economy of the vehicle can be achieved without the need for addition of a new device.

The aforementioned operations for control may be performed only during regeneration of an electric vehicle. In this case, a heat source can be maintained without the need for use of electric power accumulated in a battery (not shown in the drawings). Thus, power consumption is reduced further.

A semiconductor element mounted on the semiconductor device 1 may be an element made of silicon carbide (SiC) and the like capable of operating under high temperatures, or a different constituent element of the semiconductor device 1 may be made of a material allowing the constituent element to operate under high temperatures. In this case, the semiconductor device 1 is capable of operating in higher temperatures, making it possible to respond to increase of refrigerant's temperature more satisfactorily. Additionally, the aforementioned operations for control can be performed in shorter time, so that power consumption can be kept at a lower level.

<Modifications>

The preferred embodiment is based on the assumption that the temperature of a heat exchange target is lower than the temperature of a heat source. However, the present invention is not limited to this case, but it is also applicable to the case where the temperature of a heat exchange target is higher than the temperature of a heat source.

Figure 3:
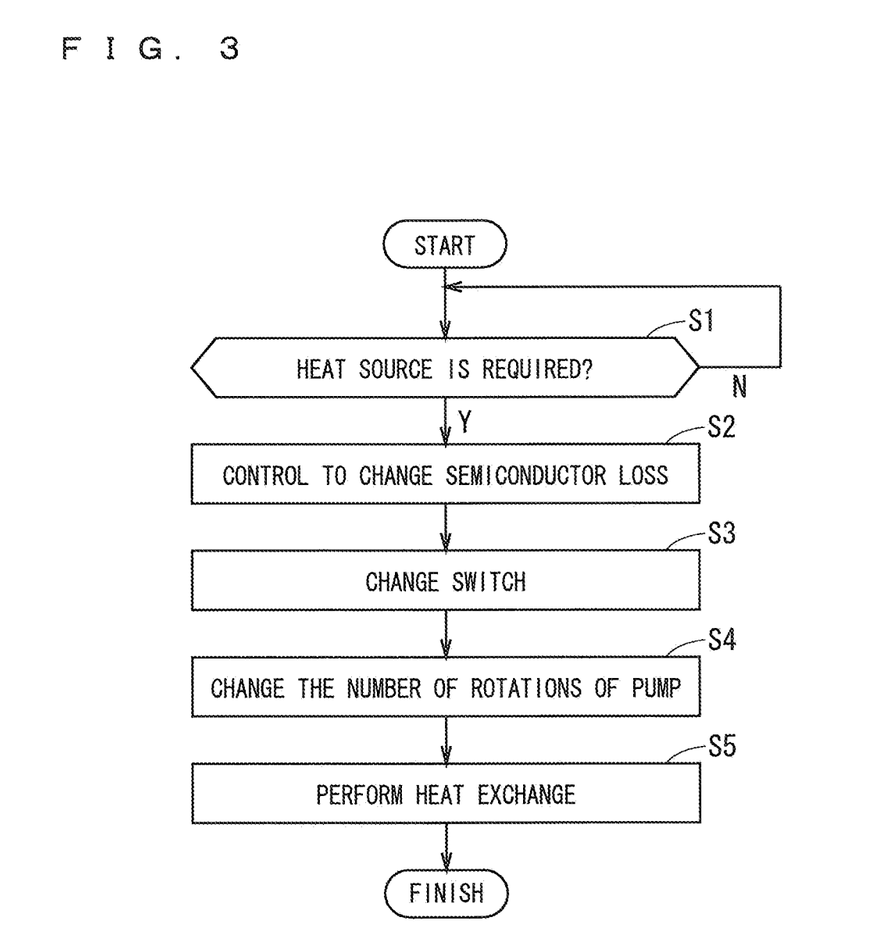
FIG. 3 is a flow diagram showing the operation of the cooling system of the preferred embodiment of the present invention.

The flow diagram of FIG. 3 is feasible even if only one of steps S2 to S4 is performed. Further, the order in which steps S2 to S4 are performed is not limited to the one shown in the flow diagram of FIG. 3.

The preferred embodiment is based on the assumption that a refrigerant is liquid (cooling water). Meanwhile, an applicable refrigerant is also a gaseous refrigerant such as air, a $CO_2$ refrigerant and a CFC refrigerant, and a solid refrigerant, for example. These refrigerants are applicable by exerting the same control and providing the same device structure.

If a gaseous refrigerant is applied, in-vehicle air may be taken in to the heat exchanger 4. In the meantime, the gaseous refrigerant in the heat exchanger 4 having exchanged heat with the semiconductor device 1 may be emitted into the vehicle. If the heat exchanger 4 is provided in an air conditioner being one of vehicle's facilities, heat exchange can be performed inside the air conditioner.

<Effects>

According to the preferred embodiment of the present invention, the semiconductor device generating variable heating loss includes the heating controller 22 that controls loss (heating loss) in the semiconductor device 1 such that target temperature and refrigerant's temperature become the same.

The semiconductor device of this structure is capable of making the heating controller 22 control loss (heating loss) to change refrigerant's temperature, thereby obtaining a heat source that achieves target temperature.

Also, the cooling system of the preferred embodiment of the present invention includes the heat exchanger 4 that uses a refrigerant to perform heat exchange with a heat exchange target in an electric vehicle being an electrically powered member. The semiconductor device 1 generates variable heating loss, and includes the heating controller 22 that controls heating loss in the semiconductor device 1 such that target temperature and refrigerant's temperature become the same.

The cooling system of this structure is capable of performing heat exchange by using a refrigerant as a heat source that is controlled in temperature with heat generated in the semiconductor device 1. So, generation of heat dedicated to heat exchange is not required in an electric vehicle and the like using electricity as a power source. This suppresses reduction of a distance to empty due to consumption of power by generation of heat for heat exchange.

Further, in the cooling system of the preferred embodiment of the present invention, a refrigerant is liquid, and the heat exchanger 4 performs heat exchange by making the refrigerant contact in-vehicle atmosphere in a manner that allows heat transfer therebetween.

In the cooling system of this structure, heat is exchanged in the cooler 2 between the liquid refrigerant and the semiconductor device 1. The refrigerant is then guided to a contact part (not shown in the drawings) formed for example in the refrigerant bypass flow path 5, thereby realizing heat exchange in the contact part between in-vehicle atmosphere and the refrigerant.

Further, in the cooling system of the preferred embodiment of the present invention, the heat exchanger 4 guides a refrigerant to the refrigerant bypass flow path 5 to exchange heat with a heat exchange target.

In the cooling system of this structure, heat is exchanged between a refrigerant and a heat exchange target (such as in-vehicle atmosphere) in a place determined with a high degree of flexibility, thereby increasing convenience. Additionally, if heat exchange is not intended, flow of the refrigerant into the refrigerant bypass flow path 5 is prevented by operating the flow path bypass switch 8. Thus, the refrigerant can be used more efficiently for cooling.

Still further, in the cooling system of the preferred embodiment of the present invention, the flow path 20 has heat insulating properties.

The cooling system of this structure allows a refrigerant to be guided to a heat exchange target without causing emission of heat to members other than the heat exchange target even if the refrigerant is guided through the flow path 20, thereby the temperature of the refrigerant can be kept at the controlled temperature in the semiconductor device 1. Thus, the performance of the refrigerant functioning as a heat source is enhanced so heat can be transferred efficiently to the heat exchange target. Preventing unintentional transfer of heat to members other than the heat exchange target also increases convenience.

In the cooling system of the preferred embodiment of the present invention, a heat exchange target is atmosphere in an electric vehicle, and target temperature is set as the temperature of the atmosphere in the electric vehicle.

The cooling system of this structure is capable of placing the atmosphere in the electric vehicle at desirable temperature by controlling heating loss in the semiconductor device 1.

In the cooling system of the preferred embodiment of the present invention, the heat exchanger 4 is provided in an air conditioner mounted on an electric vehicle.

The cooling system of this structure allows heat exchange in the air conditioner with atmosphere in the electric vehicle, so that the atmosphere in the electric vehicle can be placed at desirable temperature.

Further, in the cooling system of the preferred embodiment of the present invention, an electrically powered member is a vehicle using electricity and equipped with an engine (hybrid vehicle), a heat exchange target is cooling water for cooling the engine, and target temperature is set as the temperature of the cooling water.

The cooling system of this structure is capable of placing the cooling water for cooling the engine at desirable temperature by controlling heating loss in the semiconductor device 1. Thus, the cooling water can be kept at temperature at which the engine can be cooled satisfactorily.

Still further, in the cooling system of the preferred embodiment of the present invention, an electrically powered member is a vehicle using electricity and equipped with an engine (hybrid vehicle), a heat exchange target is a catalyst for the engine, and target temperature is set as the temperature of the catalyst for the engine.

The cooling system of this structure is capable of placing the catalyst for the engine at desirable temperature by controlling heating loss in the semiconductor device 1. Thus, the temperature of the catalyst can be increased to temperature at which the catalyst exhibits its reducing ability satisfactorily so that the catalyst is allowed to maintain its purifying performance at a satisfactory level.

Additionally, in the cooling system of the preferred embodiment of the present invention, an electrically powered member is an electric vehicle driven under hydraulic control, a heat exchange target is hydraulic oil used for the hydraulic control, and target temperature is set as the temperature of the hydraulic oil.

The cooling system of this structure is capable of placing the hydraulic oil at desirable temperature by controlling heating loss in the semiconductor device 1.

Further, in the cooling system of the preferred embodiment of the present invention, the heating controller 22 controls heating loss in the semiconductor device 1 during regeneration of an electric vehicle.

The cooling system of this structure is capable of obtaining a heat source without the need for use of electric power accumulated in a battery of the electric vehicle, for example, making it possible to reduce power consumption.

In the cooling system of the preferred embodiment of the present invention, the cooling system further includes the ECU 7 functioning as a flow rate controller that controls the flow rate of a refrigerant such that target temperature and refrigerant's temperature become the same.

The cooling system of this structure is capable of controlling the temperature of the refrigerant by controlling the flow rate of the refrigerant. As an example, the temperature of the refrigerant can be increased by reducing the flow rate thereof.

In the present invention, any constituent element of the preferred embodiment can be modified or omitted without departing from the scope of the invention.

While the invention has been shown and described in detail, the foregoing description is in all aspects illustrative and not restrictive. It is therefore understood that numerous modifications and variations can be devised without departing from the scope of the invention.

What is claimed is:

1. A semiconductor device applicable in a cooling system including a setting part that sets target temperature of a refrigerant used to cool the semiconductor device, a detector that detects the temperature of said refrigerant as refrigerant's temperature, and a heat exchanger that performs heat exchange with a heat exchange target by using said refrigerant, the semiconductor device generating variable heating loss, the semiconductor device comprising:

a heating controller that controls said heating loss in said semiconductor device such that said target temperature and said refrigerant's temperature become the same,
wherein said heat exchanger guides said refrigerant to a bypass flow path from a primary flow path by switching a flow path bypass switch and then performs heat exchange with said heat exchange target.

2. The semiconductor device according to claim 1, wherein said heating controller changes said heating loss in the semiconductor device by changing turn-on and turn-off speeds of a semiconductor.

3. The semiconductor device according to claim 2, wherein said turn-on and turn-off speeds are changed by controlling a resistance value that controls a gate current flowing in said semiconductor.

4. The semiconductor device according to claim 2, wherein said turn-on and turn-off speeds are changed by controlling a current value of a constant current circuit that controls a gate current flowing in said semiconductor.

5. The semiconductor device according to claim 2, wherein said turn-on and turn-off speeds are changed by controlling a gate voltage value of said semiconductor.

6. The semiconductor device according to claim 1, wherein a semiconductor of the semiconductor device is made of a base material comprising silicon carbide.

7. The semiconductor device according to claim 1, wherein the semiconductor device is made of a constituent material including a base material comprising silicon carbide.

8. The semiconductor device according to claim 1, wherein said heat exchange with said heat exchange target occurs in said bypass flow path.

9. A cooling system, comprising:
a semiconductor device mounted on an electrically powered member driven with electric power and operating the electrically powered member;
a cooler that cools said semiconductor device with a refrigerant;
a setting part that sets target temperature of said refrigerant;
a detector that detects the temperature of said refrigerant as refrigerant's temperature; and
a heat exchanger that performs heat exchange with a heat exchange target in said electrically powered member by using said refrigerant,
said semiconductor device generating variable heating loss,
the cooling system further comprising a heating controller that controls said heating loss in said semiconductor device such that said target temperature and said refrigerant's temperature become the same,
wherein said heat exchanger guides said refrigerant to a bypass flow path from a primary flow path by switching a flow path bypass switch and then performs heat exchange with said heat exchange target.

10. The cooling system according to claim 9, wherein said heating controller is provided in said semiconductor device.

11. The cooling system according to claim 9, wherein said refrigerant is gas, and
said heat exchanger performs heat exchange by taking said gas being atmosphere in said electrically powered member and emitting said gas being said refrigerant.

12. The cooling system according to claim 9, wherein said refrigerant is liquid, and
said heat exchanger performs heat exchange by making said refrigerant thermally contact atmosphere in said electrically powered member.

13. The cooling system according to claim 9, wherein said heat exchange with said heat exchange target occurs in said bypass flow path.

14. The cooling system according to claim 9, wherein said primary flow path has heat insulating properties.

15. The cooling system according to claim 9, wherein
said heat exchange target is atmosphere in said electrically powered member, and
said target temperature is set as the desired temperature of said atmosphere in said electrically powered member.

16. The cooling system according to claim 15, wherein said heat exchanger is provided in an air conditioner mounted on said electrically powered member.

17. The cooling system according to claim 9, wherein
said electrically powered member is a vehicle using electricity and equipped with an engine,
said heat exchange target is cooling water to cool said engine, and
said target temperature is set as desired the temperature of said cooling water.

18. The cooling system according to claim 9, wherein
said electrically powered member is a vehicle using electricity and equipped with an engine,
said heat exchange target is a catalyst for said engine, and
said target temperature is set as the desired temperature of said catalyst for said engine.

19. The cooling system according to claim 9, wherein
said electrically powered member is an electric vehicle driven under hydraulic control,
said heat exchange target is hydraulic oil used for said hydraulic control, and
said target temperature is set as the desired temperature of said hydraulic oil.

20. The cooling system according to claim 9, wherein said heating controller controls said heating loss in the semiconductor device during regeneration of said electrically powered member.

21. The cooling system according to claim 9, further comprising a flow rate controller that controls the flow rate of said refrigerant such that said target temperature and said refrigerant's temperature become the same.

* * * * *